(12) United States Patent  
McKeefery et al.

(10) Patent No.: US 11,036,252 B1  
(45) Date of Patent: Jun. 15, 2021

(54) PEDAL ASSEMBLY FOR A MOTOR VEHICLE

(71) Applicant: NIO USA, Inc., San Jose, CA (US)

(72) Inventors: Martin J. McKeefery, San Jose, CA (US); Ryan T. Mackintosh, Los Gatos, CA (US); Shane L. Kenyon, Livermore, CA (US); Jorge A. Marquez Sanchez, Cupertino, CA (US)

(73) Assignee: NIO USA, Inc., San Jose, CA (US)

( * ) Notice: Subject to any disclaimer, the term of this patent is extended or adjusted under 35 U.S.C. 154(b) by 0 days.

(21) Appl. No.: 16/739,932

(22) Filed: Jan. 10, 2020

(51) Int. Cl.

| | |
|---|---|
| *G05G 1/30* | (2008.04) |
| *G05G 5/03* | (2008.04) |
| *G05G 5/05* | (2006.01) |
| *B60T 7/02* | (2006.01) |
| *G05G 1/44* | (2008.04) |
| *B60T 7/06* | (2006.01) |
| *G05G 1/38* | (2008.04) |
| *B60T 7/04* | (2006.01) |

(Continued)

(52) U.S. Cl.  
CPC .............. *G05G 5/03* (2013.01); *B60K 23/02* (2013.01); *B60K 26/021* (2013.01); *B60T 7/042* (2013.01); *B60T 7/06* (2013.01); *F16D 23/12* (2013.01); *G05G 1/38* (2013.01); *G05G 1/44* (2013.01); *G05G 5/05* (2013.01); *G05G 2505/00* (2013.01)

(58) Field of Classification Search  
CPC .. G05G 1/30; G05G 1/38; G05G 1/44; G05G 1/445; G05G 5/03; G05G 5/05; G05G 2505/00; B60K 23/02; B60K 26/021; B60T 7/042; B60T 7/06; F16D 23/12  
See application file for complete search history.

(56) References Cited

U.S. PATENT DOCUMENTS

| | | | |
|---|---|---|---|
| 5,215,176 A * | 6/1993 | Hamann ................. | F16D 23/12 192/99 S |
| 5,555,774 A * | 9/1996 | Lauring ................. | B60K 23/02 74/512 |

(Continued)

FOREIGN PATENT DOCUMENTS

| | | | |
|---|---|---|---|
| CH | 591017 A5 * | 8/1977 | ............... G05G 5/03 |
| CN | 105922979 | 9/2016 | |

(Continued)

OTHER PUBLICATIONS

Machine translation of DE 102010039375 A1 obtained on Oct. 7, 2020.*

(Continued)

*Primary Examiner* — Adam D Rogers  
(74) *Attorney, Agent, or Firm* — Sheridan Ross P.C.

(57) ABSTRACT

A pedal assembly for use in a motorized vehicle comprises a horizontal member, a pedal connected to the horizontal member at a first position, and a spring having a first end and a second end. The spring is connected at the first end to the pedal, and is connected at the second end to the horizontal member at a second position. Depressing the pedal within a first range of angles causes the spring to exert a reactive force within a first range of values increasing at a rate having a first maximum slope. Depressing the pedal within a second range of angles causes the spring to exert a reactive force within a second range of values increasing at a rate having a second maximum slope.

20 Claims, 4 Drawing Sheets

(51) Int. Cl.
*F16D 23/12* (2006.01)
*B60K 23/02* (2006.01)
*B60K 26/02* (2006.01)

(56) References Cited

U.S. PATENT DOCUMENTS

| | | | |
|---|---|---|---|
| 6,309,031 | B1 | 10/2001 | Crombez et al. |
| 6,360,629 | B2 | 3/2002 | Schambre et al. |
| 6,450,061 | B1 | 9/2002 | Chapman et al. |
| 6,629,472 | B2 | 10/2003 | Scheidling et al. |
| 6,808,040 | B2 | 10/2004 | Hayashihara et al. |
| 9,022,488 | B2 | 5/2015 | Beier et al. |
| 9,487,198 | B2 * | 11/2016 | Kim .................. G05G 5/03 |
| 9,889,826 | B2 | 2/2018 | Periasamy et al. |
| 10,259,438 | B2 * | 4/2019 | Goto .................. B60T 7/22 |
| 2005/0269875 | A1 | 12/2005 | Maki et al. |
| 2006/0169092 | A1 | 8/2006 | Prat Terradas et al. |
| 2007/0034038 | A1 * | 2/2007 | Horie .................. G05G 1/30 74/512 |
| 2010/0154582 | A1 * | 6/2010 | Malcuy .................. G05G 5/03 74/512 |
| 2012/0152053 | A1 * | 6/2012 | Kondo .................. F16F 9/145 74/513 |
| 2013/0338894 | A1 * | 12/2013 | Olofsson .................. B60T 7/042 701/70 |
| 2014/0116192 | A1 * | 5/2014 | Hemmege Venkatappa ................ G05G 1/44 74/512 |
| 2015/0001914 | A1 * | 1/2015 | Antao .................. F16D 61/00 303/3 |
| 2018/0043865 | A1 | 2/2018 | Pennala et al. |

FOREIGN PATENT DOCUMENTS

| | | | | |
|---|---|---|---|---|
| DE | 102008054626 A1 * | 6/2010 | ................ G05G 5/03 |
| DE | 102010039375 A1 * | 2/2012 | ........... B60K 26/021 |
| DE | 102019007170 A1 * | 4/2020 | ............. B60K 26/02 |
| EP | 2020652 | 2/2009 | |
| FR | 2913119 A1 * | 8/2008 | ........... B60K 26/021 |
| FR | 3064707 A1 * | 10/2018 | ............. F16D 23/12 |
| WO | WO 2018/149558 | 8/2018 | |

OTHER PUBLICATIONS

U.S. Appl. No. 16/532,102, filed Aug. 5, 2019, Sanchez.
U.S. Appl. No. 16/739,872, filed Jan. 10, 2020, McKeefery.
Savitski et al., "Advanced Control Functions of Decoupled Electro-Hydraulic Brake System," IEEE 14th International Workshop on Advanced Motion Control at Auckland, New Zealand, Apr. 22-24, 2016, 8 pages.
Official Action for U.S. Appl. No. 16/739,872, dated Mar. 31, 2020 7 pages.
Official Action for U.S. Appl. No. 16/739,872, dated Jun. 25, 2020 9 pages.

* cited by examiner

PEDAL ASSEMBLY FOR A MOTOR VEHICLE

FIELD

The present disclosure is generally directed to a pedal assembly for a motor vehicle.

BACKGROUND

Motor vehicles, including cars, trucks, and buses, often include pedals positioned in front of a driver's seat. Such pedals include an accelerator or gas pedal, a brake pedal, and, in vehicles with manual transmission systems, a clutch pedal. Traditionally, such pedals have been mechanically connected to components of the vehicle such that depressing the pedal initiates a mechanical response in the vehicle system. For example, depressing an accelerator may open a throttle valve. Depressing a brake pedal may cause frictional brake pads to contact road wheels. Depressing a clutch pedal may disengage a clutch system to allow for gear shifting. In each case, the fact that depressing the pedal operates vehicle components through mechanical connections has traditionally meant that the pedal exerts a reactive force against the foot corresponding to mechanical forces generated by the components of the vehicle. As a result, vehicle operators have grown accustomed to the "feel" of certain pedals in mechanical systems.

Many modern vehicles use "wire" systems rather than mechanical systems. In wire systems, depressing a pedal does not cause mechanical operation of vehicle components through mechanical connections, but instead creates an electronic signal or other type of signal that causes a processor to cause actuators to control corresponding vehicle components. Because wire pedals are not mechanically connected in traditional ways, the "feel" of the pedals may be different from what operators are accustomed to.

Accordingly, it is an object of the present invention to provide a pedal assembly that creates a traditional pedal feel in a wired pedal system.

DETAILED DESCRIPTION

Figure 1:
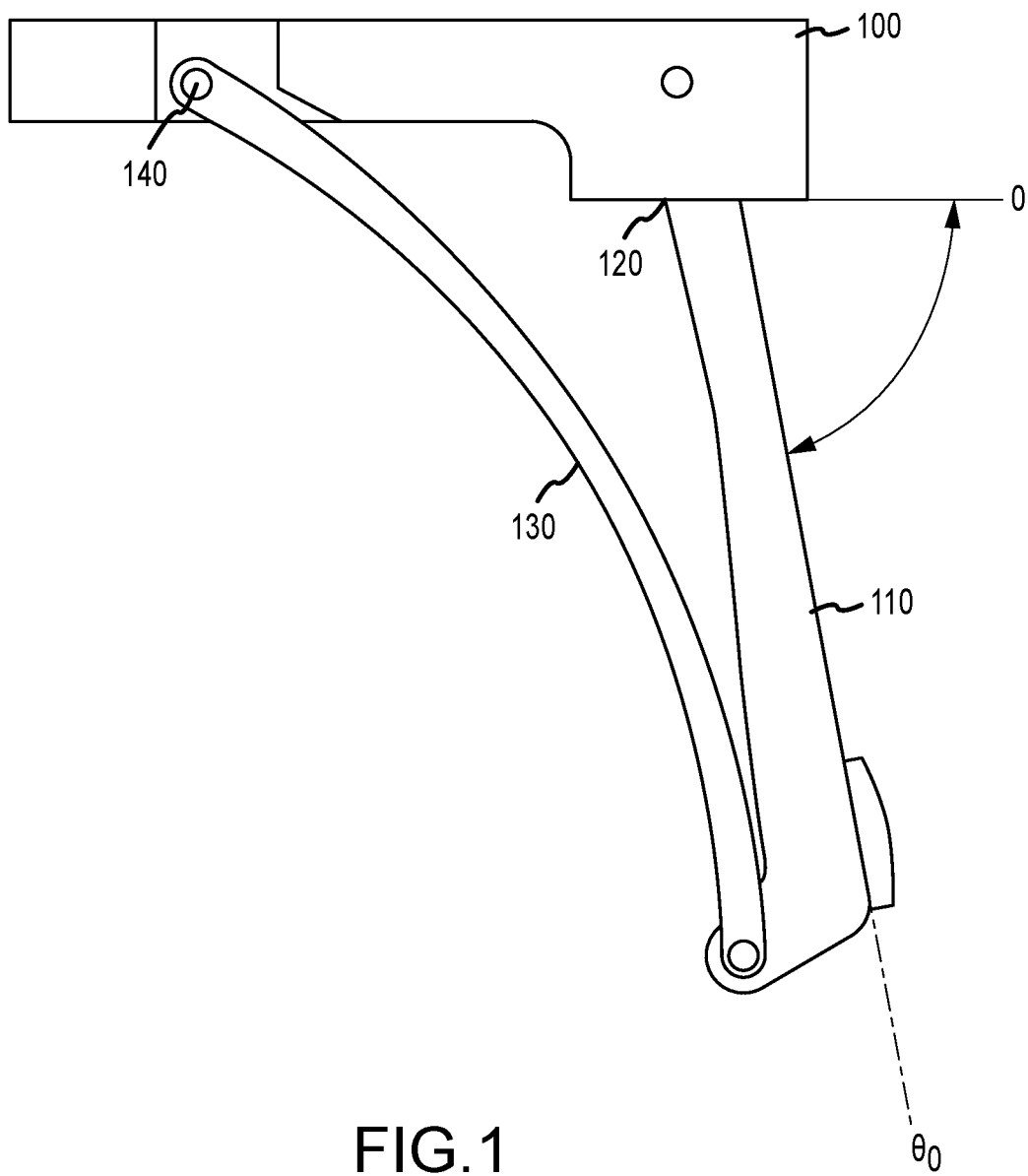
FIG. 1 shows a pedal assembly in accordance with embodiments of the present disclosure.

Embodiments of the present disclosure will be described in connection with a vehicle, and more particularly with respect to an automobile. However, for the avoidance of doubt, the present disclosure encompasses the use of the aspects described herein in vehicles other than automobiles. Further, embodiments of the present disclosure will be described in connection with drive by wire systems. However, for the avoidance of doubt, the present disclosure encompasses the use of aspects described herein in non-drive by wire systems.

Drive by wire technology uses electrical or electro-mechanical systems to control vehicle components traditionally performed by mechanical connections. Drive by wire systems employ actuators and modified forms of traditional mechanical user input devices such as steering wheels and pedals. Components such as the steering column, shafts, pumps, hoses, belts, coolers and vacuum servos and master cylinders may be eliminated from the vehicle. Examples of drive by wire systems include electronic throttle control and brake-by-wire systems, which may be used together.

There are several advantages of drive by wire systems. First, an electronic throttle is significantly lighter in weight than a traditional mechanical throttle system, improving fuel efficiency. Drive by wire systems are also easier to maintain, as maintenance may be performed by a computer interface rather than mechanical operations. Electronic control also allows for more precision in controlling various operations of the vehicle compared to mechanical components which may wear, stretch, or otherwise degrade due to age and/or use. This significantly enhances the safety and performance of drive by wire vehicles compared to mechanical vehicles. Vehicle operations can also be finely programmed by automotive manufacturers or maintenance personnel, rather than relying on less predictable mechanical components.

Further, because operator controls are not limited by mechanics, controls can be fine-tined to user preferences, including ergonomic preferences.

Examples of drive by wire systems that may employ pedals include electronic throttle control, brake by wire, and shift by wire. In electronic throttle control, a wired accelerator pedal replaces a traditional mechanical accelerator pedal. In brake by wire, a wired brake pedal replaces a traditional mechanical brake pedal. In shift by wire, both the traditional mechanical clutch pedal and mechanical gearshift lever may be replaced by electronic components. Further, shift by wire may eliminate the need for a clutch pedal altogether, though certain users may prefer an emulated clutch pedal to replicate the feel of a traditional manual transmission system.

In an electronic throttle control system, the accelerator pedal is electronically connected to the throttle, replacing a mechanical connection. An electronic throttle system may comprise an accelerator pedal assembly; a throttle valve that can be opened and closed, for example, by an electric motor; and an engine control module operating as a powertrain. The engine control module may comprise a processor configured to receive signals from various vehicle sensors and calculate the proper throttle position based on sensor data. The primary sensor data for this purpose is the data supplied by the accelerator position sensors, but additional data may be used, including data related to engine speed, vehicle speed, road conditions, and obstacles.

An electronic throttle control system has the advantage of maintaining constant throttle control characteristics from the perspective of the operator regardless of vehicle conditions, road conditions, and other variables. An electronic throttle control system may also compensate for user error or other unsafe operator conduct by, for example, reducing rapid accelerations and decelerations.

Electronic throttle control also enhances the operation of existing electronic vehicle control systems such as cruise control, stability control, and collision avoidance systems, all of which require control of the speed and acceleration of the vehicle through operation of the throttle, and may require throttle operation independent of the position of the accelerator pedal.

A key feature of electronic throttle control is the lack of mechanical connection between the accelerator pedal and the throttle valve. The accelerator pedal assembly includes a sensor which transmits signals to a processor for control of actuators to control the position of the throttle, such as by an electric motor.

A brake by wire system controls vehicle brakes through electrical rather than purely mechanical and/or hydraulic means. A brake by wire system uses electronic sensors and actuators to control brakes in a manner traditionally performed by mechanical components such as pumps, hoses, fluids, belts, vacuum servos and master cylinders. Traditional operator components such as pedals are still used.

Brake by wire technology has been deployed in electric vehicles and hybrid vehicles. For example brake by wire has been used in their regenerative braking systems for electric vehicles and hybrid vehicles. Certain systems use a modified ABS (antilock brake system) actuator coupled with a hydraulic brake master cylinder to create a hydraulic system, coupled with a brake control unit. The brake control unit is a computer system that controls brake functions.

In a brake by wire system, the brake pedal apparatus comprises a sensor that measures the force generated by depressing a brake pedal. An actuator may provide pressure, such as hydraulic pressure, to the braking the system and valves to pressurize road wheel calipers to apply a friction brake in response to the brake pedal force sensor.

The primary sensor for the brake by wire system is the sensor associated with the pedal assembly that senses the position of the brake pedal. However, other sensors may provide data to control the brake system. These sensors include wheel speed sensors, traction sensors, battery charge sensors, positional sensors, steering wheel position sensors, and the positions of other pedals.

In addition to hydraulic braking systems, which are typical on passenger vehicles, brake by wire systems may be used with compressed air braking systems, such as those used on heavy duty commercial vehicles.

In a typical operation of a brake by wire system, once the operator inputs a brake command to the system by depressing a brake pedal, a sensor associated with the brake pedal assembly generates signals which are transmitted to the engine control unit via an onboard communications system. The engine control unit then generates brake commands, which are sent to four electric calipers via the communication network. It will be understood that redundant communication paths would be useful to ensure that brake commands reach the calipers.

Each caliper comprises a controller that receives the brake commands. Each controller in turn provides drive control commands to a power control module. Each power control module supplies controlled current to an associated brake actuator. Each brake actuator may be, for example, a magnetic motor or other type of motor. Each brake actuator, in turn, controls the application of friction brakes to respective road wheels in response to brake commands.

In a non-autonomous vehicle, a semi-autonomous vehicle, or an autonomous vehicle with a manual mode, primary control of the braking system still rests with the operator of the vehicle. Many operators are accustomed to the feel of a traditional mechanical brake. Accordingly, it would be advantageous for a brake by wire pedal assembly to emulate the feel of a mechanical braking system.

FIG. 1 shows a pedal assembly in accordance with an embodiment of the present disclosure. The pedal assembly comprises a horizontal member 100 which may be attached at one end to the interior wall of the vehicle in front of the driver seat. The pedal assembly further comprises a pedal 110 attached to the horizontal member 100 at a first position 120. The pedal assembly further comprises a spring 130 attached to the pedal 110 at one end and attached to the horizontal member 100 at the other end at a second position 140.

In a resting position, i.e., when no pressure is applied to the pedal by the operator of the vehicle, the pedal is at an angle $\theta_0$ with respect to the horizontal member 100.

Figure 2:
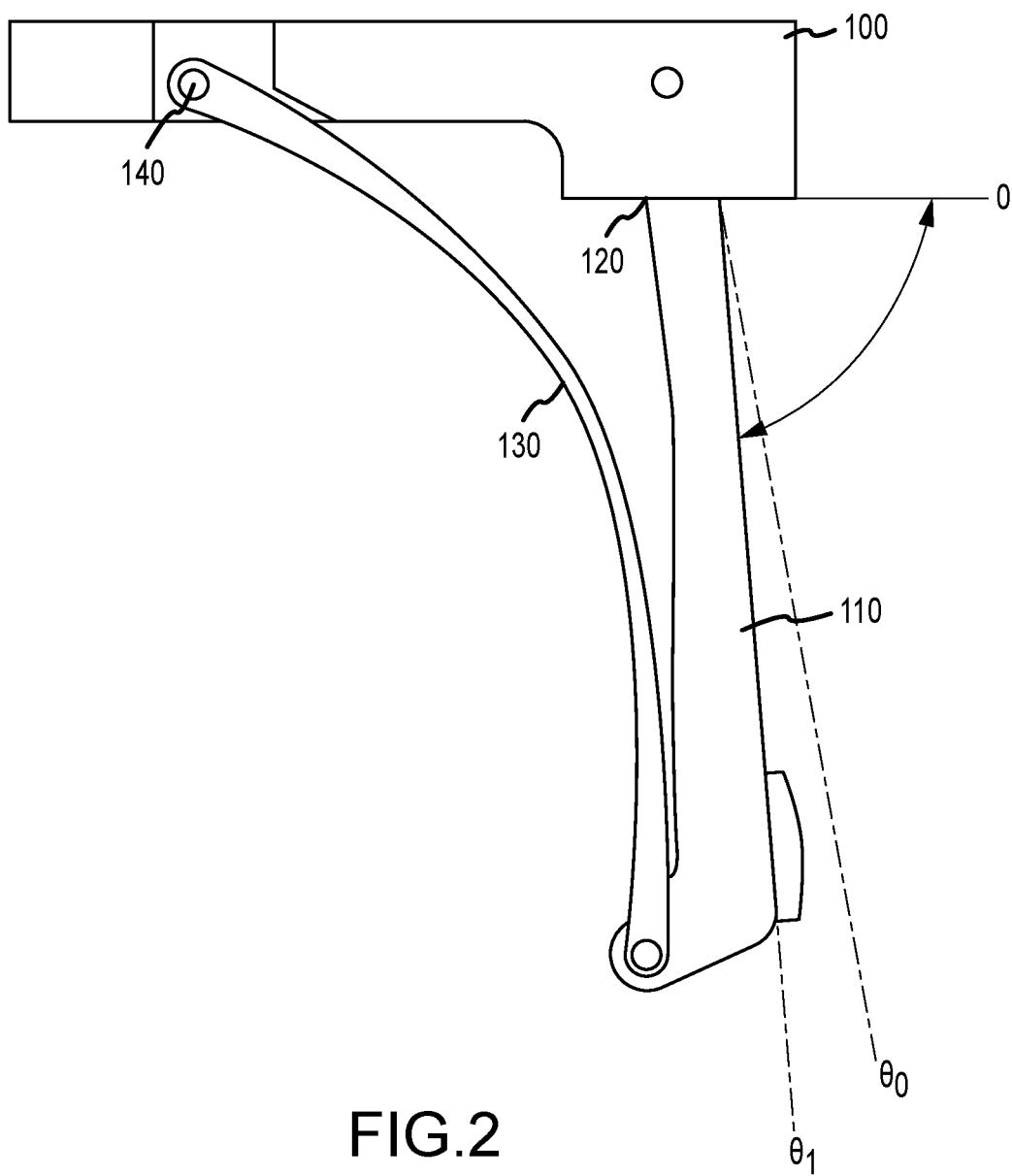
FIG. 2 shows a pedal assembly in accordance with embodiments of the present disclosure.

FIG. 2 shows a pedal assembly in accordance with an embodiment of the present disclosure. In FIG. 2, pedal 110 is shown depressed to an angle of $\theta_1$ with respect to the horizontal member 100. When the pedal is depressed in the range of from $\theta_0$ to $\theta_1$ (the first stage), spring 130 exerts a reactive force. The reactive force in the first stage increases gradually as the pedal is depressed further from angle $\theta_0$ toward $\theta_1$, to a maximum force of N with a maximum rate of increase in force of X.

Figure 3:
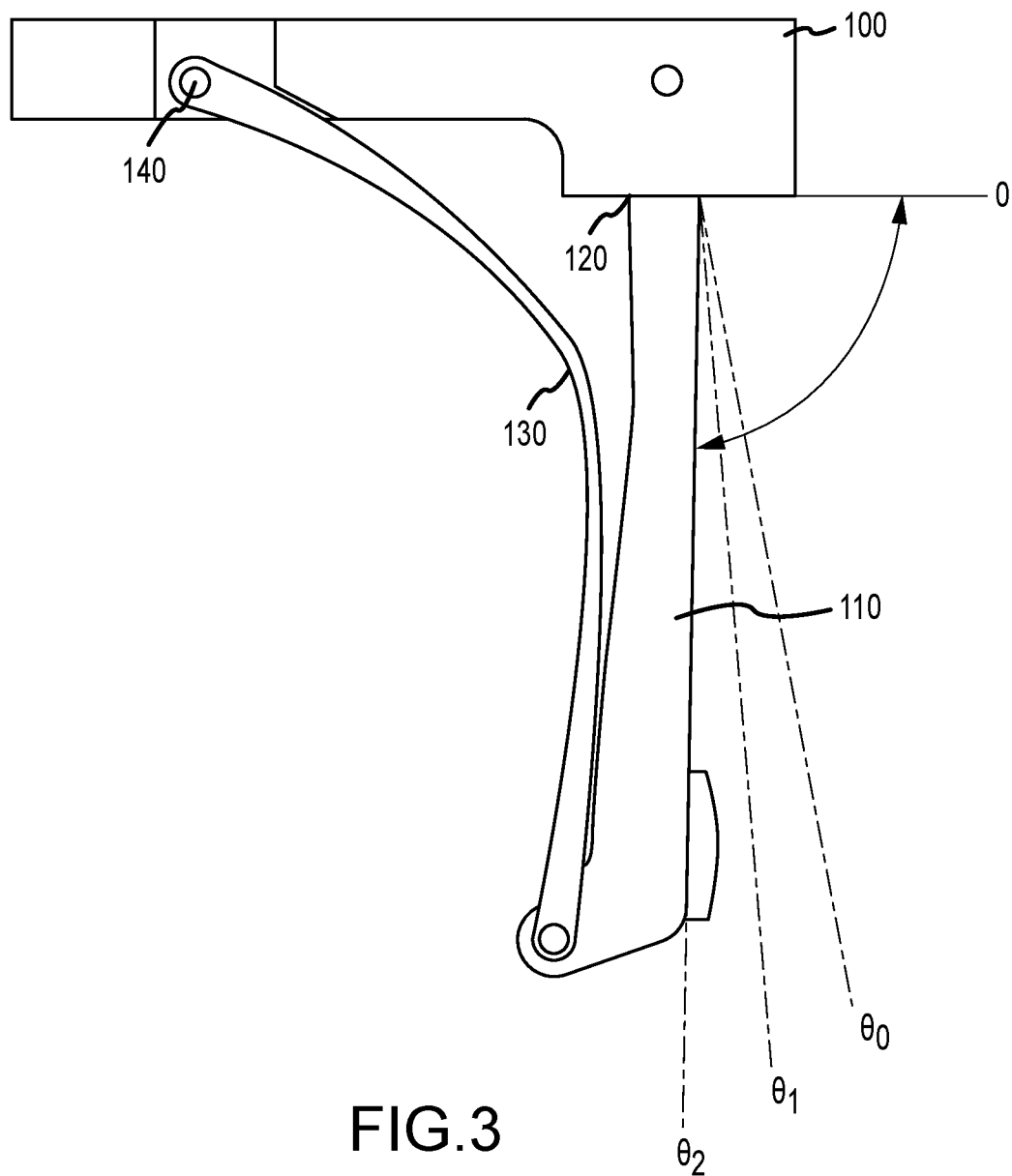
FIG. 3 shows a pedal assembly in accordance with embodiments of the present disclosure.

FIG. 3 shows a pedal assembly in accordance with an embodiment of the present disclosure. In FIG. 3, pedal 110 is shown depressed to an angle of $\theta_2$ with respect to the horizontal member 100. $\theta_2$ is the maximum angle to which pedal 110 may be depressed. When the pedal is depressed in the range of from $\theta_1$ to $\theta_2$ (the second stage), spring 130 exerts a reactive force. The reactive force in the first stage increases as the pedal is depressed further from angle $\theta_1$ toward $\theta_2$, less gradually than in the first stage, to a maximum force of M with a maximum rate of increase in force of Y.

Figure 4:
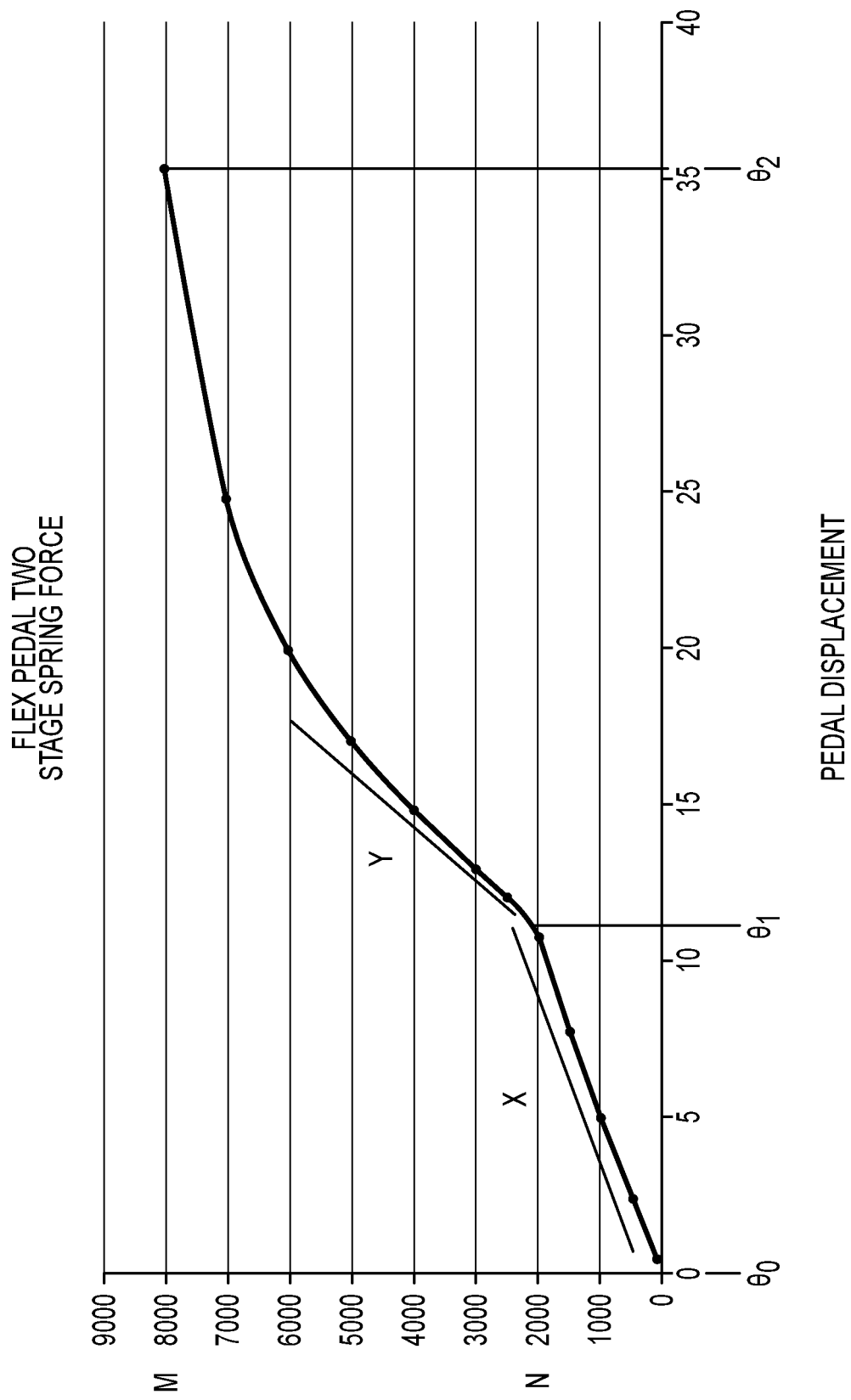
FIG. 4 shows pedal force as a function of pedal displacement in accordance with embodiments of the present disclosure.

FIG. 4 shows the force exerted by the spring 130 as a function of displacement of the pedal 110 in accordance with an embodiment of the present disclosure. When the pedal 110 is depressed in the range of $\theta_0$ to $\theta_1$ (the first stage), spring 130 exerts an amount of force in a first range of values (0,N) having a first maximum slope X. When the pedal 110 is depressed in the range of $\theta_1$ to $\theta_2$ (the second stage), spring 130 exerts an amount of force in a second range of values (M,N) having a second maximum slope Y.

The pedal assembly according to this embodiment of the present disclosure thus comprises a two-stage brake pedal assembly in which depressing the brake pedal in a first range of angles creates a reactive force in a first range of values increasing at a rate having a first maximum slope as the degree of depression increases, and in which depressing the brake pedal in a second range of angles creates a reactive force in a second range of values increasing at a rate having a second maximum slope as the degree of depression increases. This pedal assembly is suitable for use in a brake by wire system, as it emulates the feel of a traditional mechanical brake. It will be understood that this pedal assembly can be integrated with a brake by wire system as described above.

The pedal assembly disclosed herein is also suitable for use in an electric throttle control system.

The pedal assembly disclosed herein is also suitable for use in a shift by wire system.

The pedal assembly disclosed herein is also suitable for use in a non-pedal by wire system, for example, a mechanical braking system with a feel other than the traditional braking feel associated with traditional mechanical braking systems.

The features of the various embodiments described herein are not intended to be mutually exclusive. Instead, features and aspects of one embodiment may be combined with features or aspects of another embodiment. Additionally, the description of a particular element with respect to one embodiment may apply to the use of that particular element in another embodiment, regardless of whether the description is repeated in connection with the use of the particular element in the other embodiment.

Examples provided herein are intended to be illustrative and non-limiting. Thus, any example or set of examples provided to illustrate one or more aspects of the present disclosure should not be considered to comprise the entire set of possible embodiments of the aspect in question. Examples may be identified by the use of such language as "for example," "such as," "by way of example," "e.g.," and other language commonly understood to indicate that what follows is an example.

The systems and methods of this disclosure have been described in relation to the pedal mechanism(s) for a vehicle. However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should, however, be appreciated that the present disclosure may be practiced in a variety of ways beyond the specific detail set forth herein.

A number of variations and modifications of the disclosure can be used. It would be possible to provide for some features of the disclosure without providing others.

The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease, and/or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Embodiments include a pedal apparatus for use in a motorized vehicle, comprising: a horizontal member; a pedal attached to the horizontal member at a first position on the horizontal member, the pedal configured to rotate in a first range of angles and a second range of angles relative to the horizontal member; and a spring comprising a first end and a second end; wherein the first end of the spring is attached to the pedal; and the second end of the spring is attached to the horizontal member at a second position on the horizontal member; wherein the spring is configured to exert an amount of force within a first range of values increasing at rate having a first maximum slope on the pedal when the pedal is within the first range of angles and an amount of force within a second range of values increasing at rate having a second maximum slope on the pedal when the pedal is within the second range of angles.

Aspects of the above pedal apparatus include: the pedal is a brake pedal; the pedal is a gas pedal; the pedal is a clutch pedal; the second maximum slope is greater than the first maximum slope; at least one of the horizontal member, the pedal, and the spring are comprised of a synthetic polymer; and the synthetic polymer is injection molded plastic.

Embodiments include a pedal system for use in a motorized vehicle, comprising: a horizontal member; a pedal attached to the horizontal member at a first position on the horizontal member, the pedal configured to rotate in a first range of angles and a second range of angles relative to the horizontal member; and a spring comprising a first end and a second end; wherein the first end of the spring is attached to the pedal; and the second end of the spring is attached to the horizontal member at a second position on the horizontal member; a sensor configured to sense the position of the pedal; a processor; and a computer-readable storage medium storing computer-readable instructions, which when executed by the processor, cause the processor to perform operations comprising: receiving one or more signals from the sensor indicating the position of the pedal; and communicating with one or more actuators to control one or more vehicle components in response to said one or more signals; wherein the spring is configured to exert an amount of force within a first range of values increasing at rate having a first maximum slope on the pedal when the pedal is within the first range of angles and an amount of force within a second range of values increasing at rate having a second maximum slope on the pedal when the pedal is within the second range of angles.

Aspects of the above pedal apparatus include: the pedal is a brake pedal; the pedal is a gas pedal; the pedal is a clutch pedal; the second maximum slope is greater than the first maximum slope; at least one of the horizontal member, the pedal, and the spring are comprised of a synthetic polymer; and the synthetic polymer is injection molded plastic.

Embodiments include a method of operating a motorized vehicle, comprising: depressing a pedal to form a first selected angle in a first range of angles relative to a horizontal member, the pedal attached to the horizontal member at a first position on the horizontal member, the pedal attached to a first end of a spring comprising a first end and a second end, the second end of the spring attached to the horizontal member at a second position on the horizontal member; and depressing the pedal to form a second selected angle in a second range of angles relative to the horizontal member; wherein the spring is configured to exert an amount of force within a first range of values increasing at rate having a first maximum slope on the pedal when the pedal is within the first range of angles and an amount of force within a second range of values increasing at rate having a second maximum slope on the pedal when the pedal is within the second range of angles and wherein the maximum slope associated with the first selected angle is different from the maximum slope associated with the second selected angle.

Aspects of the above method include: at least one of the steps of depressing a pedal in a first range of angles and depressing the pedal in a first range of angles further comprises causing the motorized vehicle to decelerate; at least one of the steps of depressing a pedal in a first range of angles and depressing the pedal in a first range of angles further comprises causing the motorized vehicle to accelerate; at least one of the steps of depressing a pedal in a first range of angles and depressing the pedal in a first range of angles further comprises disengaging a clutch assembly of the motorized vehicle; the second maximum slope is greater than the first maximum slope; activating a sensor configured to sense the position of the pedal; causing one or more signals indicating the position of the pedal to be generated by the sensor; causing a processor to receive the one or more signals from the sensor; and causing the processor to communicate with one or more actuators to control one or more vehicle components in response to said one or more signals.

Any one or more of the aspects/embodiments as substantially disclosed herein optionally in combination with any one or more other aspects/embodiments as substantially disclosed herein.

One or means adapted to perform any one or more of the above aspects/embodiments as substantially disclosed herein.

The phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

What is claimed is:

1. A pedal apparatus for use in a motorized vehicle, comprising:
    a horizontal member;
    a pedal attached to the horizontal member at a first position on the horizontal member, the pedal configured to rotate in a first range of angles and a second range of angles relative to the horizontal member; and
    one spring comprising a first end and a second end; wherein:
        the first end of the one spring is attached to the pedal; and
        the second end of the one spring is attached to the horizontal member at a second position on the horizontal member;
    wherein the one spring is configured to exert an amount of force within a first range of values increasing at a rate having a first maximum slope on the pedal when the pedal is within the first range of angles and a different amount of force within a second range of values increasing at a rate having a second maximum slope on the pedal when the pedal is within the second range of angles; and
    wherein the one spring consists of a curved piece of material, a radius of curvature of the one spring is a same value in a region between said first end and said second end when the one spring is in a resting position, and a central region of the one spring is bent toward the pedal when the one spring is in a depressed position.

2. The pedal apparatus of claim 1, wherein the pedal is a brake pedal.

3. The pedal apparatus of claim 1, wherein the pedal is an acceleration pedal.

4. The pedal apparatus of claim 1, wherein the pedal is a clutch pedal.

5. The pedal apparatus of claim 1, wherein the second maximum slope is greater than the first maximum slope.

6. The pedal apparatus of claim 1, wherein at least one of the horizontal member, the pedal, and the one spring are comprised of a synthetic polymer.

7. The pedal apparatus of claim 6, wherein the synthetic polymer is injection molded plastic.

8. A pedal apparatus for use in a motorized vehicle, comprising:
    a horizontal member;
    a pedal attached to the horizontal member at a first position on the horizontal member, the pedal configured to rotate in a first range of angles and a second range of angles relative to the horizontal member; and
    one spring comprising a first end and a second end; wherein:
        the first end of the one spring is attached to the pedal; and
        the second end of the one spring is attached to the horizontal member at a second position on the horizontal member;
    wherein the one spring is configured to exert an amount of force within a first range of values increasing at a rate having a first maximum slope on the pedal when the pedal is within the first range of angles and a different amount of force within a second range of values increasing at a rate having a second maximum slope on the pedal when the pedal is within the second range of angles;
    wherein the one spring consists of a curved piece of material, a radius of curvature of the one spring is a same value in a region between said first end and said second end when the one spring is in a resting position, and a central region of the one spring is bent toward the pedal when the one spring is in a depressed position; and
    wherein a maximum angle within the first range of angles is not greater than 90 degrees.

9. The pedal apparatus of claim 8, wherein the pedal is a brake pedal.

10. The pedal apparatus of claim 8, wherein the pedal is an acceleration pedal.

11. The pedal apparatus of claim 8, wherein the pedal is a clutch pedal.

12. The pedal apparatus of claim 8, wherein the second maximum slope is greater than the first maximum slope.

13. The pedal apparatus of claim 8, wherein at least one of the horizontal member, the pedal, and the one spring are comprised of a synthetic polymer.

14. The pedal apparatus of claim 13, wherein the synthetic polymer is injection molded plastic.

15. A method of operating a motorized vehicle, comprising:
    depressing a pedal to form a first selected angle in a first range of angles relative to a horizontal member, the pedal attached to the horizontal member at a first position on the horizontal member, the pedal attached to a first end of one spring comprising a first end and a second end, the second end of the one spring attached to the horizontal member at a second position on the horizontal member; and
    depressing the pedal to form a second selected angle in a second range of angles relative to the horizontal member;
    wherein the one spring is configured to exert an amount of force within a first range of values increasing at a rate having a first maximum slope on the pedal when the pedal is within the first range of angles and a different amount of force within a second range of values increasing at a rate having a second maximum slope on the pedal when the pedal is within the second range of angles and wherein a maximum slope associated with the first selected angle is different from a maximum slope associated with the second selected angle; and wherein the one spring consists of a curved piece of material, a radius of curvature of the one spring is a same value in a region between said first end and said second end when the one spring is in a resting position, and a central region of the one spring is bent toward the pedal when the one spring is in a depressed position.

16. The method of claim 15, wherein at least one of the steps of depressing the pedal in the first range of angles and depressing the pedal in the second range of angles further comprises causing the motorized vehicle to decelerate.

17. The method of claim 15, wherein at least one of the steps of depressing the pedal in the first range of angles and depressing the pedal in the second range of angles further comprises causing the motorized vehicle to accelerate.

18. The method of claim 15, wherein at least one of the steps of depressing the pedal in the first range of angles and depressing the pedal in the second range of angles further comprises disengaging a clutch assembly of the motorized vehicle.

19. The method of claim 15, wherein the second maximum slope is greater than the first maximum slope.

20. The method of claim 15, wherein a maximum angle within the first range of angles is not greater than 90 degrees.

* * * * *